March 29, 1927. 1,622,419
A. J. CHAPIN
AUTOMOTIVE BRAKE
Filed Dec. 15, 1923
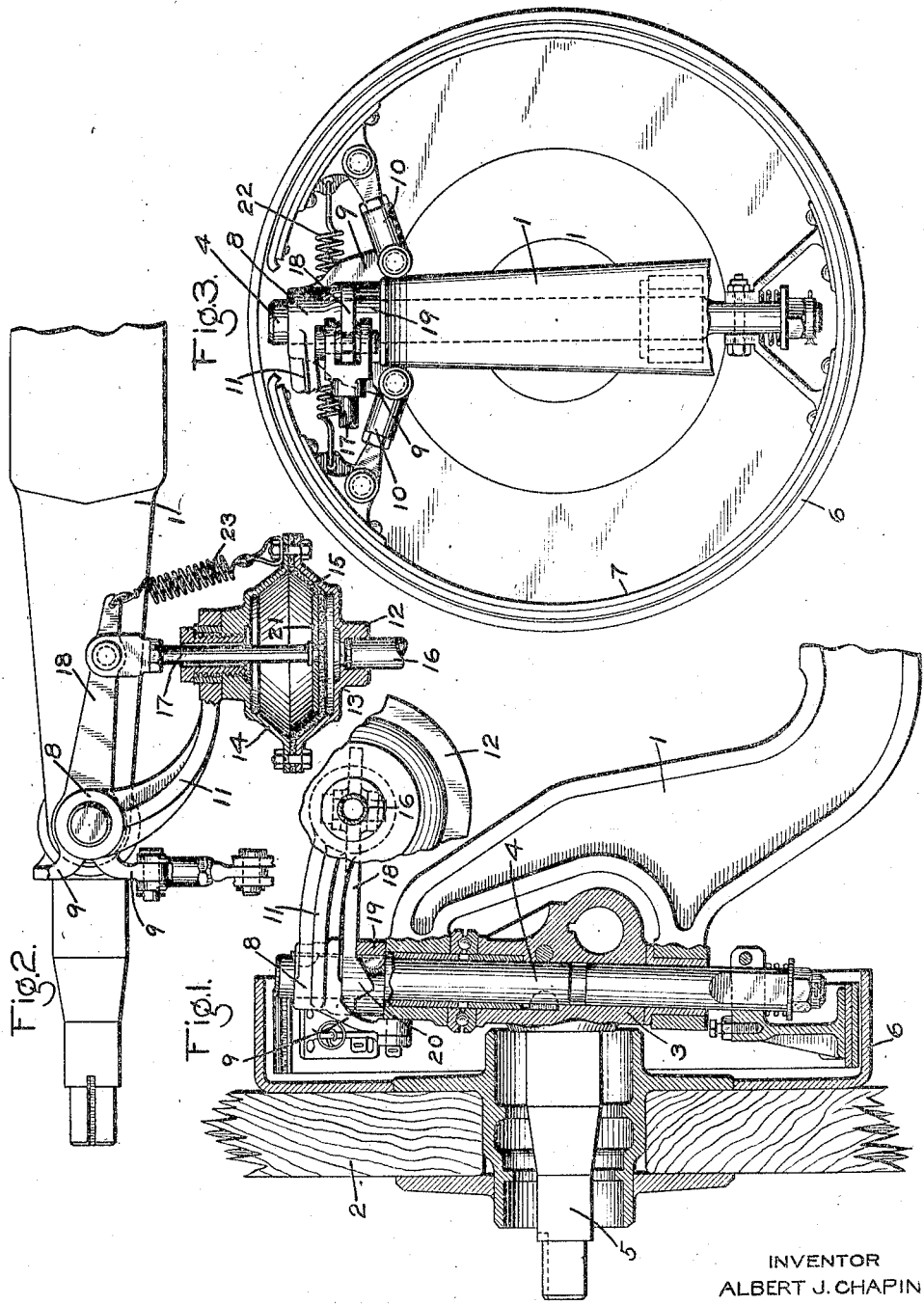
INVENTOR
ALBERT J. CHAPIN
BY
ATTORNEY Patented Mar. 29, 1927.

1,622,419

UNITED STATES PATENT OFFICE.

ALBERT J. CHAPIN, OF OAKLAND, CALIFORNIA, ASSIGNOR TO THE WESTINGHOUSE AIR BRAKE COMPANY, OF WILMERDING, PENNSYLVANIA, A CORPORATION OF PENNSYLVANIA.

AUTOMOTIVE BRAKE.

Application filed December 15, 1923. Serial No. 680,863.

This invention relates to a fluid pressure brake construction adapted more particularly to be applied to the front wheels of a motor vehicle.

The principal object of my invention is to provide an improved fluid pressure brake construction of the above character.

In the accompanying drawing; Fig. 1 is a section through the axis of the king pin of a vehicle front wheel construction, showing the improved fluid pressure brake applied thereto; Fig. 2 a plan view, in part, of the construction shown in Fig. 1; and Fig. 3 an inner face view of the construction shown in Fig. 1.

As shown in the drawing, the front wheel construction may comprise the usual parts including a front axle 1, a front wheel 2, a steering knuckle 3 mounted on a king pin 4, between the forked ends of the axle 1, and having the usual spindle 5, upon which the front wheel is mounted.

A brake drum 6 having an internal friction face is secured to the front wheel 2 and mounted in said drum is a brake head 7 having an arcuate face adapted to frictionally engage the friction face of the drum 6.

The king pin 4 is splined to and therefore rotates with the steering knuckle 3 and said pin extends upwardly and on the upward extension is splined a sliding sleeve 8, so that said sleeve is free to slide on the king pin but is prevented from rotating thereon. The sleeve 8 is provided with arms 9 which are pivotally connected to links 10, said links being pivotally connected to the end portions of the braking member 7.

The sleeve 8 also carries a bracket arm 11 for supporting a brake chamber 12. Said brake chamber may comprise flanged casing members 13 and 14 between which is clamped a flexible diaphragm 15. A pipe 16 is connected to one side of the diaphragm and a pressure plate 21 engages the other side thereof. A rod 17 is secured to said pressure plate, the outer end of which is pivotally connected to a lever arm 18. Said lever arm 18 is mounted to freely rotate on the king pin 4 between the sleeve 8 and a collar 19 which is splined to the king pin. A cam portion 20 is provided on the lever arm 18 and said cam portion normally engages in a corresponding notch in the collar 19 when the parts are in release position.

In operation, when fluid under pressure is supplied through pipe 16 to the flexible diaphragm 15, the diaphragm is forced outwardly and the diaphragm rod 17 operates to rotate the cam lever 18. The rotation of lever 18 causes the cam 20 to ride up out of the notch in the collar 19, thereby lifting the sleeve 8 and the arms 9. The links 10 are therefore raised so that the braking member 7 is forced into frictional engagement with the drum 6 and thus an application of the brakes is effected.

When fluid is released from the diaphragm 15, the parts are returned to release position so as to effect the release of the brakes, the release movement being effected by the usual release spring 22 assisted by spring 23.

Having now described my invention, what I claim as new and desire to secure by Letters Patent, is:—

1. In an automotive front wheel brake, the combination with a front wheel steering knuckle having a king pin, of a brake drum associated with the front wheel, a braking member coacting with said drum, a laterally extending bracket arm secured to said king pin, and a brake chamber carried by said bracket and operatively connected to said braking member.

2. In an automotive front wheel brake, the combination with a front wheel steering knuckle having a king pin, of a brake drum associated with the front wheel, a braking member coacting with said drum, a sleeve mounted on said king pin, links operatively connected to said sleeve for operating said braking member, a brake chamber carried by said sleeve, and a cam member for operating said sleeve and operatively connected to said brake chamber.

3. In an automotive front wheel brake, the combination with a front wheel steering knuckle having a king pin, of a brake drum associated with the front wheel, a braking member coacting with said drum, a sleeve slidably mounted on said king pin, links carried by said sleeve and operatively connected to said braking member, a cam lever rotatably mounted on said king pin for operating said sleeve, and a brake chamber rotatably movable with said king pin and operatively connected to said cam lever.

4. In an automotive front wheel brake, the combination with a front wheel steering knuckle having a king pin, of a brake operating sleeve slidably and non-rotatably mounted on said king pin, a cam lever rotatably mounted on said king pin for operating said sleeve, a brake chamber carried by said sleeve and containing a flexible diaphragm operable by fluid under pressure, and a diaphragm rod operated by said diaphragm and operatively connected to said cam lever.

In testimony whereof I have hereunto set my hand.

ALBERT J. CHAPIN.